No. 635,320. Patented Oct. 24, 1899.
W. E. HENDRICKS.
TOP FOR CAKE PANS.
(Application filed May 17, 1899.)
(No Model.)
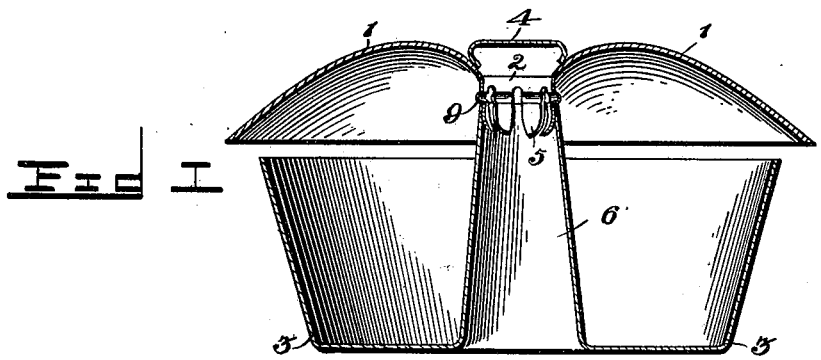
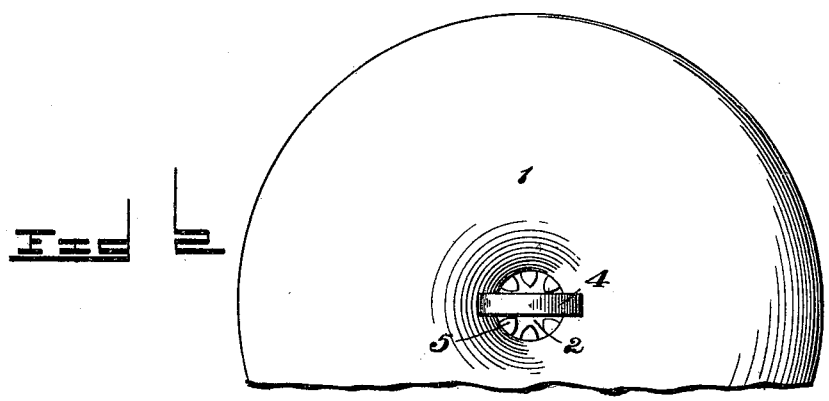
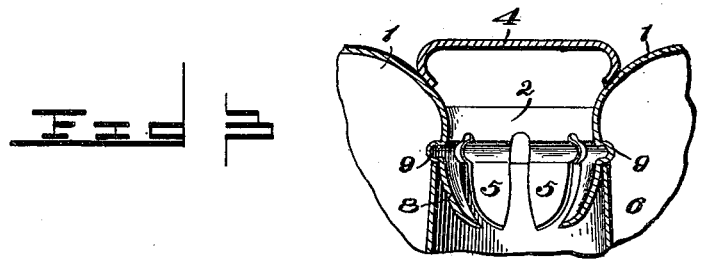
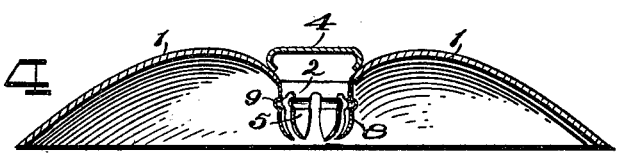
Witnesses
John Maupin.
J. J. Riley
W. E. Hendricks. Inventor
By his Attorneys,
C. A. Snow & Co.
THE NORRIS PETERS CO., PHOTO-LITHO., WASHINGTON, D. C.

UNITED STATES PATENT OFFICE.

WILLIAM E. HENDRICKS, OF CAIRO, ILLINOIS.

TOP FOR CAKE-PANS.

SPECIFICATION forming part of Letters Patent No. 635,320, dated October 24, 1899.

Application filed May 17, 1899. Serial No. 717,198. (No model.)

*To all whom it may concern:*

Be it known that I, WILLIAM E. HENDRICKS, a citizen of the United States, residing at Cairo, in the county of Alexander and State of Illinois, have invented a new and useful Top for Cake-Pans, of which the following is a specification.

The invention relates to improvements in tops for cake-pans.

The object of the present invention is to improve the construction of tops or lids for cooking utensils and to provide for cake-pans a removable top which will be simple, inexpensive, strong, and durable and capable of uniformly distributing the heat over the pan and of shielding the contents thereof from intense heat at the top, whereby the top of a cake is prevented from rapidly crusting and interfering with the proper rising and uniform cooking of the cake.

A further object of the invention is to provide a device which will enable a cake when placed in an oven to rise rapidly and evenly and which will dispense with the constant care and attention usually required for baking cakes successfully.

The invention consists in the construction and novel combination and arrangement of parts hereinafter fully described, illustrated in the accompanying drawings, and pointed out in the claims hereto appended.

In the drawings, Figure 1 is a vertical sectional view of a device constructed in accordance with this invention and shown applied to a cake-pan. Fig. 2 is a plan view of the cake-pan top. Fig. 3 is an enlarged vertical sectional view of the central portion of the top and the tubular portion of a cake-pan. Fig. 4 is a sectional view of the top.

Like numerals of reference designate corresponding parts in all the figures of the drawings.

1 designates a cake-pan top or cover provided with a central opening 2 of circular form and arched therefrom to the outer periphery of the top, which is designed to extend beyond the sides of a cake-pan 3, as clearly illustrated in Fig. 1 of the accompanying drawings. The top is provided with a handle 4, and it has a depending annular series of resilient supporting-tongues 5, arranged around the central circular opening 2 and adapted to extend into the tubular portion 6 of a cake-pan. The handle 4, which is arranged at the center of the top, extends over the central opening 2, and it has its terminals bent downward and inward and secured to the outer face of the top.

The annular series of resilient depending tongues are tapered, as shown, and curved inward to present outer convex faces 8 to enable them to be readily introduced into the upper end of the central tubular portion 6 of the cake-pan. The outer edge or periphery of the top 1 is supported above the upper edges of the sides of the cake-pan by shoulders 9, formed by grooving or bending the tongues 5 at the inner faces thereof, and the grooves or bends form exterior projecting portions which are adapted to rest upon the upper edges of the tubular portion 6. By this construction the top 1 is detachably mounted upon the cake-pan, and it may be quickly removed therefrom and replaced thereon.

When a cake is placed in an oven in an ordinary cake-pan the heat from the top of the oven bakes the top of the cake before the same rises to the proper height, and consequently the quality of the cake is greatly impaired, the cake being heavy and sometimes soft and doughy instead of being light, and when an oven is too hot a cake is often entirely spoiled. The improved top protects the cake from the heat above it and prevents it from crusting while rising and enables it to rise more rapidly and evenly, the top of the cake being evenly browned when baked. A cake with an ordinary cake-pan requires constant care and attention to prevent it from burning on top and a great deal of time is consumed in baking it. The top 1 provides an intervening air-space between it and the top of the cake, which is thereby protected, and the said top will enable a cake to be placed in an oven and left there without attention until the baking has been completed.

It will be apparent that the device is simple and comparatively inexpensive in construction, that it is applicable to the ordinary construction of bake-pans, and that the cover may be readily applied to the same and removed therefrom. The resilient tongues, which engage the central tubular portion of the bake-pan, support the top or cover above the upper edges of the sides of the pan, and thereby form an intervening air-space between the top one and the top of a cake, whereby the same will be protected and prevented from rapidly crusting or burning and will be permitted to rise rapidly and uniformly.

Changes in the form, proportion, size, and the minor details of construction within the scope of the appended claims may be resorted to without departing from the spirit or sacrificing any of the advantages of this invention.

What is claimed is—

1. A top for cake-pans having a central opening and provided with a centrally-arranged device adapted to engage the central tubular portion of a cake-pan and arranged to support the outer periphery of the top above the upper edges of the cake-pan to provide an intervening air-space, substantially as and for the purpose described.

2. A top for cake-pans provided with a central opening and having a series of depending tongues located at the said opening and adapted to engage the central tubular portion of a cake-pan and arranged to support the outer periphery of the top above the upper edges of the pan to provide an intervening space, substantially as and for the purpose described.

3. A top for cake-pans provided with a central opening and having depending resilient tongues located at the opening and adapted to extend into the central tubular portion of a cake-pan, and having shoulders arranged to support the outer periphery of the top of the pan above the upper edges thereof to provide an intervening space, substantially as described.

4. A top for cake-pans provided with a central opening, and having a series of depending inwardly-extending tongues arranged at the opening and having bends or grooves forming exterior projecting portions adapted to rest upon the central tubular portion of a cake-pan and arranged to support the outer periphery of the top, above the upper edges of the pan, to provide an intervening space, substantially as described.

5. A top for cake-pans provided with a central opening and having depending tongues or portions adapted to engage the central tubular portion of a cake-pan and arranged to support the outer periphery of the top above the upper edges of the said pan, combined with a handle secured to the cake-pan top and arranged over the central opening, substantially as described.

6. A cake-pan top provided with a central opening, and arched therefrom to its outer periphery, combined with means for supporting the top upon the tubular portion of a cake-pan with the outer periphery of the top above the upper edges of the said pan to provide an intervening space, substantially as and for the purpose described.

7. A top for cake-pans provided with a central opening designed to be located above the tubular portion of a cake-pan, said top being arched from the opening to its outer periphery, and means for supporting the outer periphery of the top above the upper edges of the sides of a cake-pan to provide an intervening space between it and the same, substantially as and for the purpose described.

In testimony that I claim the foregoing as my own I have hereto affixed my signature in the presence of two witnesses.

WILLIAM E. HENDRICKS.

Witnesses:
   E. A. SMITH,
   J. M. GUION.